(12) United States Patent
Marin-Martinod et al.

(10) Patent No.: US 7,365,449 B2
(45) Date of Patent: Apr. 29, 2008

(54) AIRCRAFT CABIN EQUIPPED WITH MEANS FOR CONTROLLING THE POWER CONSUMED BY SEAT ACTUATORS

(75) Inventors: Thierry Marin-Martinod, Nesles la Vallee (FR); Jean-Claude Robert, Le Raincy (FR)

(73) Assignee: Precilec, Auxerre (FR)

( * ) Notice: Subject to any disclaimer, the term of this patent is extended or adjusted under 35 U.S.C. 154(b) by 229 days.

(21) Appl. No.: 11/094,106

(22) Filed: Mar. 31, 2005

(65) Prior Publication Data

US 2005/0231038 A1 Oct. 20, 2005

(30) Foreign Application Priority Data

Mar. 31, 2004 (FR) ................... 04 03404

(51) Int. Cl.
*B60L 1/00* (2006.01)
(52) U.S. Cl. ....................... 307/9.1; 318/565
(58) Field of Classification Search ........... 307/9.1, 307/10.1, 32; 701/99; 318/565
See application file for complete search history.

(56) References Cited

U.S. PATENT DOCUMENTS

| 5,739,746 A | 4/1998 | Shaffer et al. |
| 5,748,473 A | 5/1998 | Breed et al. |
| 6,921,987 B2 * | 7/2005 | Marin-Martinod ........... 307/32 |
| 6,949,904 B2 * | 9/2005 | Rumney ...................... 318/565 |
| 2003/0182043 A1 * | 9/2003 | Christiansen et al. ......... 701/49 |
| 2006/0085100 A1 * | 4/2006 | Marin-Martinod et al. .... 701/3 |

FOREIGN PATENT DOCUMENTS

| FR | 2 823 027 | 10/2002 |
| WO | WO 02/076825 | 4/1998 |
| WO | WO 03/082672 | 10/2003 |

* cited by examiner

*Primary Examiner*—Michael Sherry
*Assistant Examiner*—Daniel Cavallari
(74) *Attorney, Agent, or Firm*—Young & Thompson

(57) ABSTRACT

An aircraft cabin including at least two seats, which seat each include at least two elements which can be moved relative to each other and at least one actuator for the relative displacement of these movable elements, and at least one central power control unit in the cabin in order to allocate a total available power level to each seat, where each seat includes parts for reading at least one item of morphological information of the passenger sitting in the seat, and a part for transmitting information to the central power control unit in accordance with each item of morphological information, and the central power control unit is capable of allocating to each seat a total available power level in accordance with each item of morphological information.

18 Claims, 3 Drawing Sheets

AIRCRAFT CABIN EQUIPPED WITH MEANS FOR CONTROLLING THE POWER CONSUMED BY SEAT ACTUATORS

BACKGROUND OF THE INVENTION

1. Field of the Invention

The present invention relates to an aircraft cabin, of the type comprising:

- at least two seats which each comprise at least two elements which can be moved relative to each other and at least one actuator for the relative displacement of these movable elements,
- at least one central power control unit in the cabin in order to allocate a total available power level to each seat.

2. Background Art

In passenger transport aircraft, it is necessary to provide each passenger with a given number of items of equipment which are supplied with electrical power, these items of equipment ensuring maximum comfort for the passenger.

In particular, each passenger generally has an individual light, referred to as a reading light, a power point for a laptop computer, video equipment for viewing films, items of comfort equipment, such as massage devices, and an assembly of electrical actuators which allow the movable elements of the passenger seat to be displaced.

The increase in the number of devices supplied with electrical power provided for each passenger considerably increases the electrical power consumed in the cabin of the aircraft.

It is thus necessary to control the power consumed by the passengers in the course of the flight.

To this end, it is known to monitor the electrical power effectively consumed by each passenger, and to allocate to the various passengers a suitable total available power level for the passenger so that the sum of the total available power levels allocated is less than a total maximum power level which can be allocated to the various passengers.

These methods function in a satisfactory manner but allow the power to be controlled based only on the power effectively consumed at a given time by the various passengers.

The object of the invention is to provide a power control installation which allows the use of the power available in an aircraft to be optimised in order to make the power available to the various passengers.

SUMMARY OF THE INVENTION

To this end, the subject-matter of the invention is an aircraft cabin of the above-mentioned type, wherein each seat comprises means for reading at least one item of morphological information of the passenger sitting in the seat, and means for transmitting information to the central power control unit in accordance with the or each item of morphological information and the central power control unit is capable of allocating to each seat a total available power level in accordance with the or each item of morphological information.

Reading at least one item of morphological information from each passenger allows the power in the aircraft cabin to be controlled in a predictive manner, even before the users have made use of this power. The power control is thus optimised since it takes into account the power that each passenger is likely to require and not only the power consumed at the given time.

According to specific embodiments, the aircraft cabin comprises one or more of the following features:

- the reading means comprise a sensor for measuring the weight of the passenger,
- the reading means comprise a sensor for measuring the size of at least a portion of the passenger,
- it comprises means for calculating, for each seat, a maximum nominal power level that can be consumed by the or each actuator of the seat based on the or each item of morphological information and the features of the or each actuator, and the central power control unit is capable of allocating to each seat a total available power level whose value depends on the maximum nominal power levels calculated for each seat,
- the total available power level allocated to each seat becomes higher as the or each maximum nominal power level calculated for the seat becomes higher,
- each seat comprises a local power control unit to which means for reading at least one item of morphological information are connected, and each local power control unit comprises suitable means for calculating the maximum nominal power level that can be consumed by the or each actuator of the seat based on the or each item of morphological information and the features of the or each actuator,
- each local power control unit comprises means for transmitting information to the central power control unit in accordance with the or each maximum nominal power level that can be consumed by an actuator; and
- the central power control unit comprises means for transmitting an allocated total available power level to each local power control unit and each local power control unit is capable of controlling the or each actuator so that the total power consumed is less than the total available power allocated.

BRIEF DESCRIPTION OF THE DRAWINGS

The invention will be better understood from a reading of the following description, given purely by way of example and with reference to the drawings, in which.

DETAILED DESCRIPTION OF THE INVENTION

Figure 1:
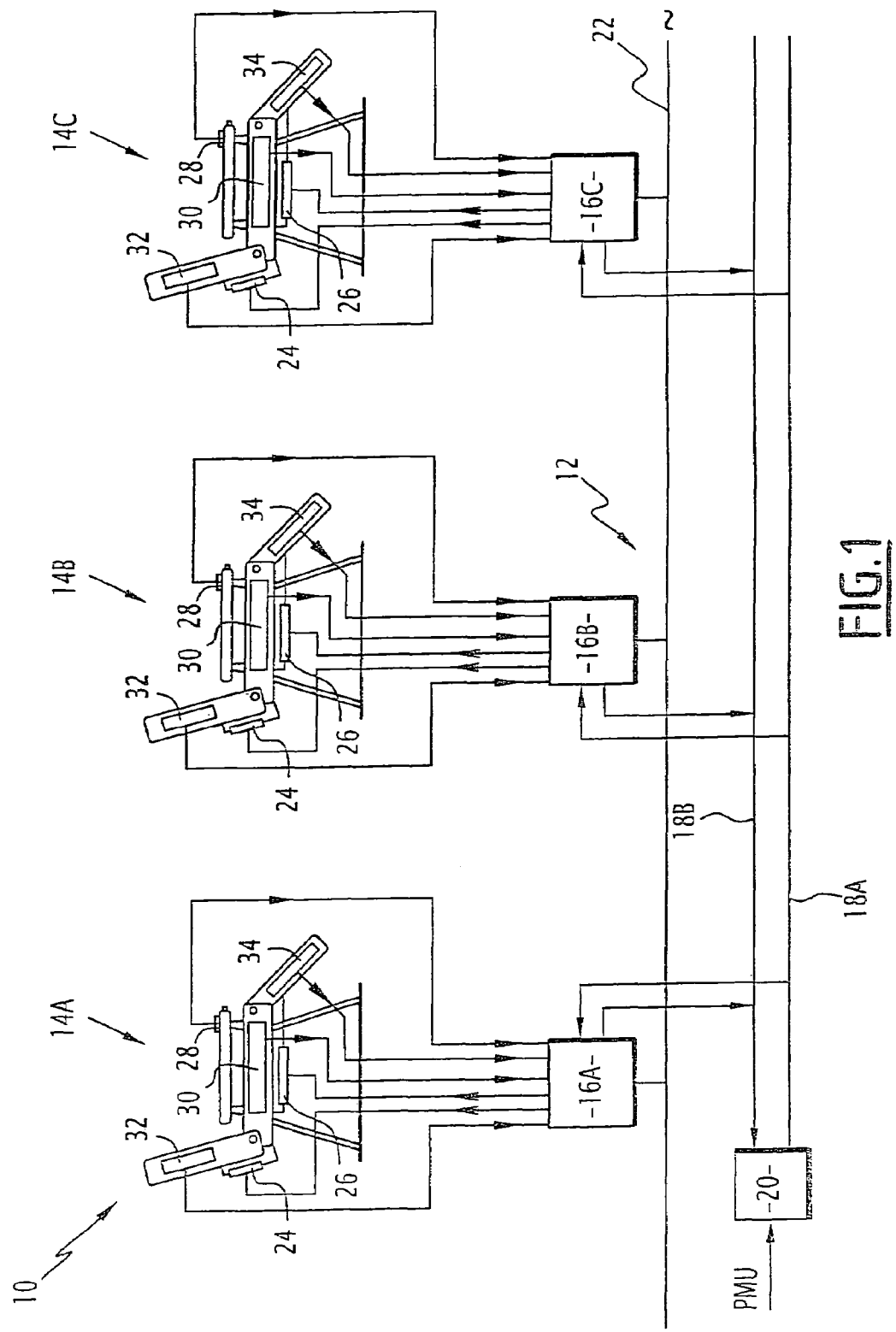
FIG. 1 is a schematic view of an aircraft cabin according to the invention.

FIG. 1 illustrates an aircraft cabin 10 which incorporates a power control installation 12.

The installation comprises a group of subscribers 14A, 14B, 14C. Each subscriber is formed by the group of devices made available to a passenger and comprises in particular the actuators with which the passenger seat is equipped.

For example, a cabin according to the invention controls the power made available to seventy subscribers in first class when the aircraft is capable of transporting three hundred passengers.

In the installation according to the invention, each subscriber comprises a local power control unit. Only three local units designated 16A, 16B, 16C are illustrated for reasons of clarity. These units are all identical. Each local power control unit is connected, by means of a bidirectional information transmission network 18, to a central power control unit 20.

To this end, the information transmission network 18 is constituted, for example, by a data transfer bus to which the central unit 20 and the local units 16A, 16B and 16C are connected. For reasons of clarity, in the Figures, the bus is indicated by two connections, one downwards which is designated 18A and transmits information from the central power control unit 20 to each of the local units 16A, 16B, 16C, and the other upwards which is designated 18B and transmits information from each local unit 16A, 16B, 16C to the central unit 20.

Furthermore, each local power control unit 16A, 16B, 16C is connected to a common electrical power distribution network 22.

Each subscriber comprises a group of loads which consume electrical power. Each load is connected to the local power control unit 16A, 16B, 16C of the subscriber.

More precisely, in the example in question, a motorised seat is provided for each passenger. This seat comprises a base, a backrest and a leg rest. Each seat, and therefore each subscriber, comprises two electrical actuators 24, 26 which allow the automatic displacement of the backrest and the leg rest relative to the base of the seat. These actuators in particular allow the seat to be displaced from a seated position to a reclined position.

Each actuator provided for the passenger can be individually controlled by the passenger from a keyboard 28. This keyboard is connected to the associated local power control unit 16A, 16B, 16C.

Furthermore, sensors for the morphological measurements of the passenger are integrated in each seat. These sensors are capable of determining morphological information of the passenger, such as his weight or his size.

A weight sensor 30 is thus arranged in the base. This sensor is formed, for example, by a piezoelectric element.

Furthermore, sensors 32 and 34 for measuring the size of the passenger are integrated in the backrest and the leg rest of the seat, respectively. These sensors are, for example, both formed by a matrix of microcontacts which are distributed along the main part of the surface of the backrest and the base.

In the rest state, that is to say, when there is no weight on the microcontacts, they are open. However, when a load is applied to a microcontact, it is closed.

When a passenger is sitting in the seat, the microcontacts located beneath the passenger, that is to say, behind the torso or the legs of the passenger, are closed, whilst the other contacts which are not loaded by the passenger are kept open. These sensors 32, 34 therefore allow the torso height $h_t$ and the leg length $l_j$ of the passenger to be determined, respectively, based on the number of closed microcontacts and/or the position thereof.

The weight sensor 30 and each of the microcontacts of the matrices of sensors 32 and 34 are connected to the local power control unit 16A, 16B, 16C which is associated with the relevant seat.

Figure 2:
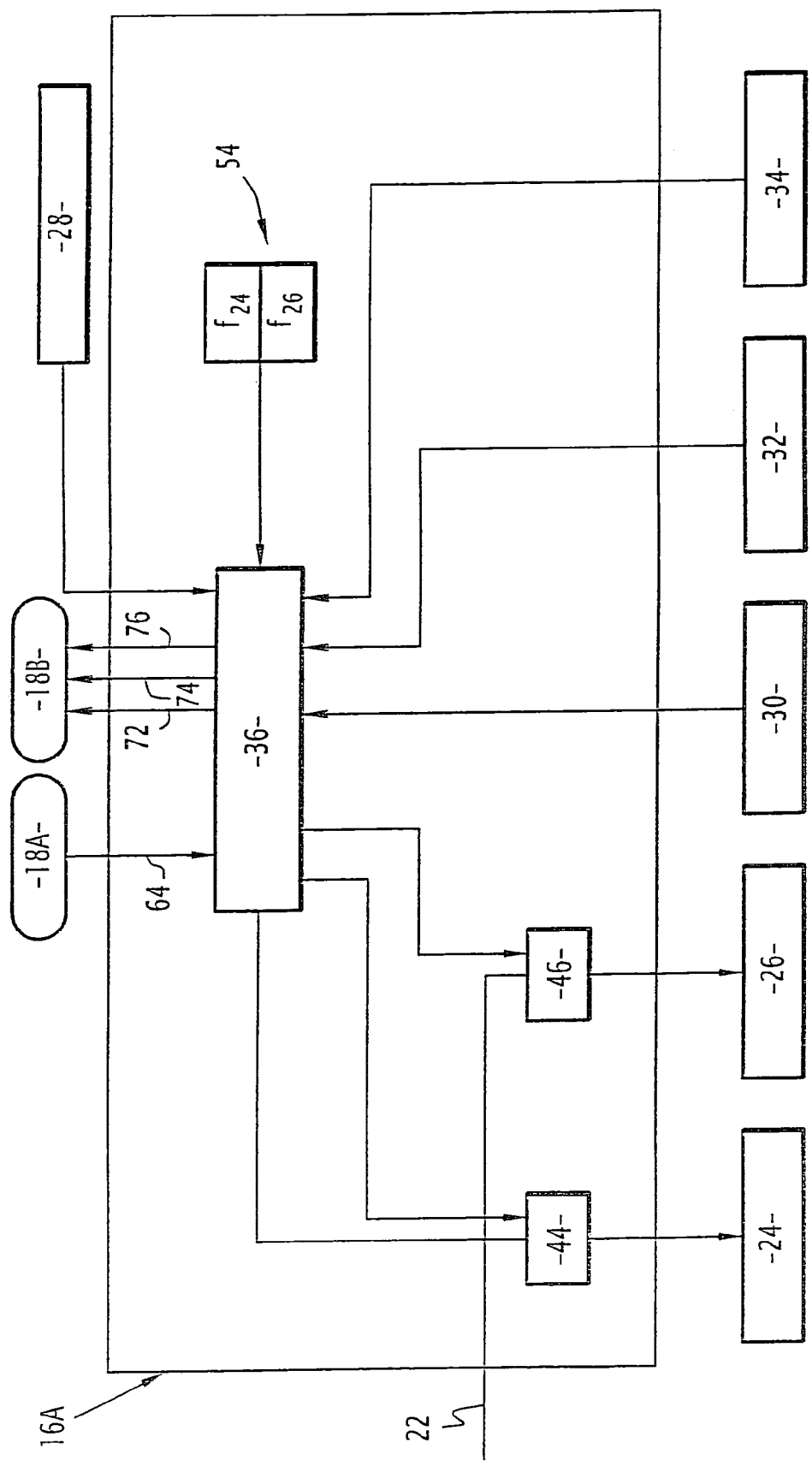
FIG. 2 is a schematic view of a local power control unit suitable for a subscriber of the cabin.

FIG. 2 illustrates in greater detail the structure of a local power control unit 16A. This unit is illustrated with its connection to the power distribution network 22, to the connections 18A, 18B of the information transmission network 18, to the keyboard 28, to the actuators 24, 26 and to the sensors 30, 32 and 34.

Each local power control unit 16A, 16B, 16C comprises a control unit 36 which is constituted by an information processing unit which is capable of using a predetermined algorithm. The control unit 36 is formed, for example, by a micro-controller which is associated with a suitable environment.

The control unit 36 is connected to the network 18 by means of a bi-directional communication interface (not shown).

Each actuator 24, 26 is connected to the power distribution network 22 via a supply current shaping step, these steps being designated 44 and 46 for the loads 24 and 26, respectively.

Each current shaping step 44, 46 is connected, for the control thereof, to the control unit 36.

Under the control of the control unit 36, each current shaping step ensures that the load connected at the output is supplied with power or that the supply to the load is stopped, or that the current is shaped in a particular manner in order to reduce the power consumed by this load.

In particular, the supply current shaping steps 44, 46 are capable of producing a current which modifies the speed of the actuators in order to vary the power consumed.

This variation of speed is, for example, produced using a control of the PWM type (pulse width modulation).

In the embodiment illustrated in FIG. 2, the local power control unit comprises storage means 54 which are connected to the control unit 36.

These storage means 54 contain, for each actuator 24, 26 connected to the local power control unit, a characteristic function $f_{24}$, $f_{26}$ for determining the maximum nominal power level that can be consumed by the actuator in accordance with the morphological information of the passenger read from the seat.

More precisely, the characteristic function $f_{24}$, which is associated with the actuator 24 of the backrest, is capable of determining the maximum nominal power level $P_{24}$ consumed by the actuator 24 in accordance with the passenger weight p read by the sensor 30 and the torso height $h_t$ of the passenger read by the sensor 32.

In the same manner, the characteristic function $f_{26}$ is capable of determining the maximum nominal power level $P_{26}$ consumed by the actuator 26 for moving the leg rest based on the passenger weight p measured by the sensor 30 and the leg length $l_j$ determined by the sensor 34.

Furthermore, the control unit 36 is capable of receiving, on the downward connection 18A of the information transmission network 18, a group of operational parameters which allow the load control input by the user from the keyboard 28 to be modified.

Although the information transmission network 18 can be of any appropriate type, for reasons of clarity in FIG. 2, each operational parameter is supposed to be communicated to the control unit 36 at a specific input.

In particular, at a first input 64, the control unit 36 receives a value $Pd_i$ which represents a total available power level allocated to the subscriber i in question.

In the same manner, the control unit 36 is capable of transmitting to the central power control unit 20, on the upward connection 18B of the information transmission network, a group of operational variables which allow the central power control unit 20 to distribute the available power between the various subscribers, and in particular to define a total available power level $Pd_i$ allocated to each subscriber.

As before, although the information transmission network 18 can be of any appropriate type, each operational variable is supposed to be communicated from the control unit at a specific output.

A first output 72 is capable of transmitting, to the central power control unit, the maximum nominal power $P_{24}$ consumed by the actuator 24 during operation, as calculated by the control unit 36 based on the characteristic function $f_{24}$. A second output 74 allows transmission, to the central information control unit, of the maximum nominal power $P_{26}$ consumed by the actuator 26 during operation, as calculated by the control unit 36 based on the characteristic function $f_{26}$.

A third output 76 allows the total power designated $Pc_i$ effectively consumed by the subscriber i to be transmitted to the central power control unit 20. The total power $Pc_i$ is determined, for example, based on a characteristic value of the power normally consumed by each load. In one variant, the total power $Pc_i$ effectively consumed is determined based on the intensity supplying each actuator, this intensity being measured by a sensor placed on the supply wire of the actuator.

The central power control unit 20 is capable of calculating and of transmitting, to each local power control unit 16A, 16B, 16C, the total available power $Pd_i$ allocated to the corresponding subscriber i. The calculation of the total available power $Pd_i$ allocated to a subscriber i will be described with reference to FIG. 3.

The central power control unit 20 comprises an input for receiving a value PMU of maximum usable power which cannot be exceeded for all the subscribers. This maximum usable power PMU is provided by another computer of the aircraft in accordance with the power which is effectively available in the aircraft.

The power control installation 12 is capable of allowing each subscriber to use only the total available power $Pd_i$ which is allocated to him. To this end, the local power control unit 36 of each subscriber is capable, in accordance with the requests made by the user from the keyboard 28, of controlling in an appropriate manner each load 24, 26 provided for the user so that the total power consumed by the subscriber is always less than the total available power $Pd_i$ allocated to the subscriber.

To this end, the control unit 36 controls a reduction or an increase of the speed of the actuators, during the control thereof, using the control of the PWM type, so that the power consumed does not exceed the total available power $Pd_i$ allocated to the subscriber.

Figure 3:
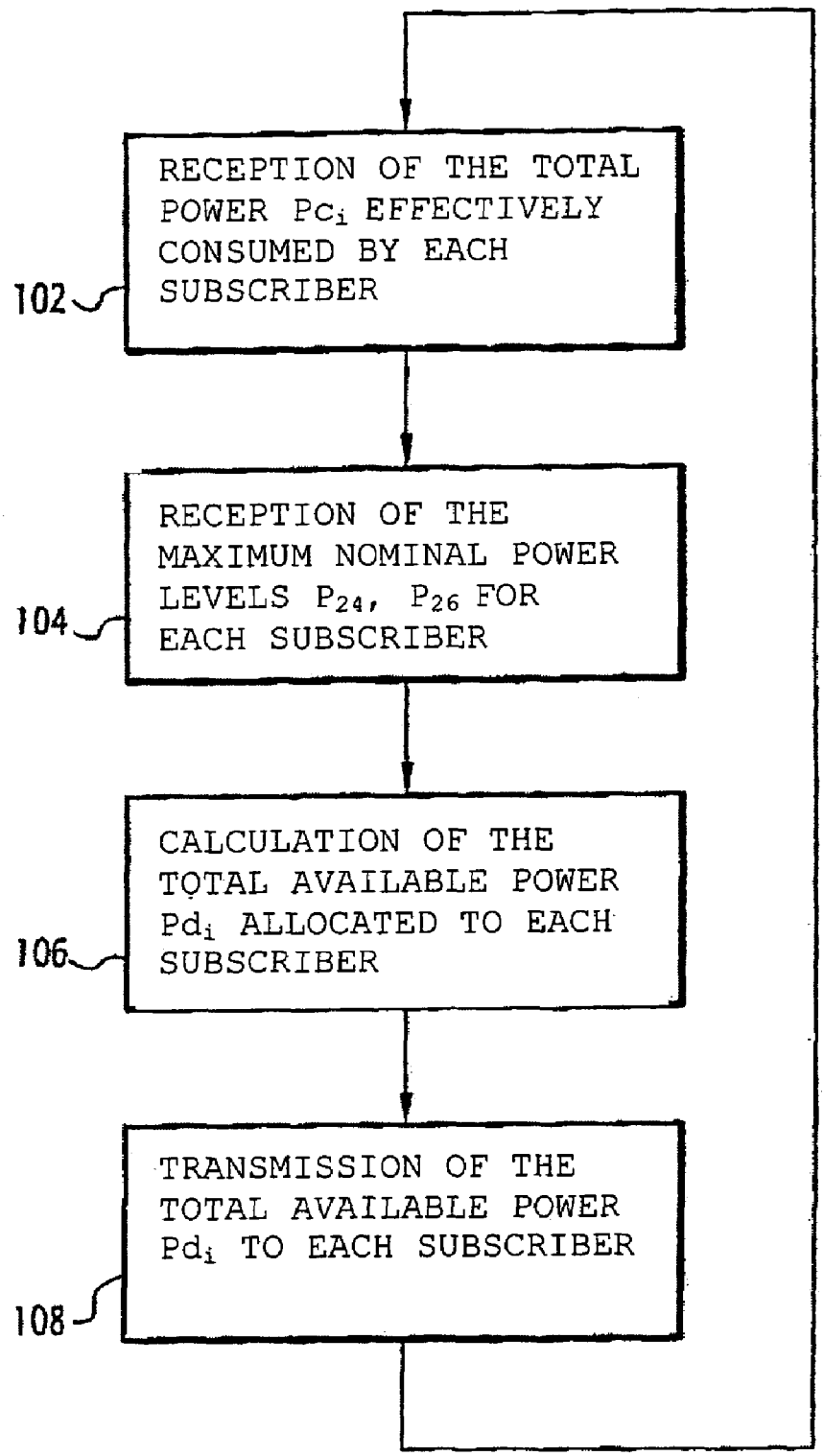
FIG. 3 is a flowchart of the algorithm used in the central power control unit of the installation.

FIG. 3 illustrates the algorithm which is continuously used by the central power control unit 20 during operation of the installation. This cyclical algorithm is operated in a loop and is capable of calculating and modifying the values of total available power $Pd_i$ allocated to each subscriber i in accordance with the effective operation conditions of the group of subscribers and the maximum usable power PMU.

In step 102, the central power control unit 20 receives, for each local power control unit 16A, 16B, 16C, the total power $Pc_i$ effectively consumed by the corresponding subscriber. To this end, the local power control units 16A, 16B, 16C, periodically transmit, at a frequency of a few Hertz, information which represents the total power $Pc_i$ effectively consumed by the associated subscriber.

In a first embodiment, the total power $Pc_i$ effectively consumed is given by the sum of the nominal power levels stored for the single loads j which are effectively operational.

In a second embodiment, the total power $Pc_i$ effectively consumed is given by the sum of the levels of instantaneous power actually consumed by the loads j of the subscriber i.

According to other embodiments, the information which represents the total power effectively consumed is constituted, depending on the circumstances, either by all the nominal power levels $P_j$ of the loads which are effectively operational or, in another embodiment, by all the instantaneous power levels $p_j$ which are actually consumed by the loads of the subscriber.

In step 104, the central power control unit 20 receives the maximum nominal power levels $P_{24}$ and $P_{26}$ for each subscriber. This reception is carried out at the same frequency as the reception of the total power $Pc_i$ effectively consumed by each subscriber.

In step 106, the central power control unit 20 calculates a new total available power level $Pd_i$ allocated to each subscriber. Each new total available power level $Pd_i$ is calculated in accordance with the total power $Pc_i$ effectively consumed and the maximum nominal power levels $P_{24}$ and $P_{26}$ calculated for each subscriber. In this manner, the total available power $Pd_i$ allocated to each subscriber is calculated by the central power control unit 20 taking into account the morphological information of each passenger.

In particular, the total available power $Pd_i$ allocated to a subscriber becomes higher as the maximum nominal power levels $P_{24}$, $P_{26}$ calculated for the subscriber become higher.

For example, the new total available power level $Pd_i$ is given by the formula:

$$Pd_i = (P_{24} + P_{26}) \times \left(1 + \frac{Pc_i}{2(P_{24} + P_{26})}\right)$$

$$\text{If } Pc_i = 0 \text{ then } Pd_i = P_{24} + P_{26}$$

$$\text{If } Pc_i = P_{24} + P_{26} \text{ then } Pd_i = \frac{3}{2}(P_{24} + P_{26})$$

In step 108, the new total available power levels $Pd_i$ calculated to be allocated to each subscriber are transmitted to the subscriber so that each local power control unit 16A, 16B, 16C controls the loads in such a manner that the total power consumed remains less than this new allocated total available power level.

It will be appreciated that, since the power control is carried out taking into account morphological information relating to the passenger, even though the passenger does not require any power, the method for controlling power used is improved since it takes into account, in a pre-emptive manner, the future requirements of each passenger, these requirements varying in accordance with the morphological criteria of the passenger.

We claim:

1. Aircraft cabin comprising:
   at least two seats, each seat comprising at least two elements which can be moved relative to each other and at least one actuator for the relative displacement of these movable elements,
   at least one central power control unit in the cabin in order to allocate a total available power level to each seat, wherein,
   each seat further comprises means for reading at least one item of morphological information of the passenger sitting in the seat, and means for transmitting information to the central power control unit in accordance with each item of the read morphological information, and
   the central power control unit is capable of allocating to each seat a total available power level in accordance with each item of the read morphological information.

2. Cabin according to claim 1, wherein the reading means comprise a sensor for measuring the weight of the passenger.

3. Cabin according to claim 1, wherein the reading means comprise a sensor for measuring the size of at least a portion of the passenger.

4. Cabin according to claim 1, further comprising:
means for calculating, for each seat, a maximum nominal power level that can be consumed by each actuator of the seat based on each item of the read morphological information and features of each actuator, and the central power control unit is capable of allocating to each seat a total available power level whose value depends on the maximum nominal power levels calculated for each seat.

5. Cabin according to claim 4, wherein the total available power level allocated to a specific seat becomes higher as the maximum nominal power level calculated for the specific seat becomes higher.

6. Cabin according to claim 4, wherein each seat comprises a local power control unit to which means for reading at least one item of morphological information are connected, and in that each local power control unit comprises suitable means for calculating the maximum nominal power level that can be consumed by each actuator of the seat based on each item of morphological information and the features of each actuator.

7. Cabin according to claim 6, wherein each local power control unit comprises means for transmitting information to the central power control unit in accordance with each maximum nominal power level that can be consumed by an actuator.

8. Cabin according to claim 6, wherein the central power control unit comprises means for transmitting an allocated total available power level to each local power control unit and each local power control unit is capable of controlling each actuator so that the total power consumed is less than the total available power allocated.

9. An aircraft cabin, comprising:
two seats, each seat comprising i) at least two elements with each element movable relative to each other element and ii) at least one actuator for the relative displacement of the movable elements; and
at least one central power control unit in the cabin in order to allocate a total available power level to each seat, wherein,
each seat further comprises i) a sensor configured to read at least one item of morphological information of a passenger sitting in the seat, and ii) a transmitter for transmitting information to the central power control unit in accordance with each item of the read morphological information, and
the central power control unit is configured to allocate to each seat a total available power level in accordance with each item of the read morphological information.

10. Cabin according to claim 1, wherein the sensor measures the weight of the passenger.

11. Cabin according to claim 10, wherein the sensor further measures the size of at least a portion of the passenger.

12. Cabin according to claim 9, further comprising:
means for calculating, for each seat, a maximum nominal power level that can be consumed by each actuator of the seat based on each item of the read morphological information and features of each actuator, and the central power control unit configured to allocate to each seat a total available power level whose value depends on the maximum nominal power levels calculated for each seat.

13. Cabin according to claim 12, wherein the total available power level allocated to a specific seat becomes higher as the maximum nominal power level calculated for the specific seat becomes higher.

14. Cabin according to claim 12, wherein each seat comprises a local power control unit to which the sensor is connected, and each local power control unit comprises means for calculating the maximum nominal power level that can be consumed by each actuator of the seat based on each item of the read morphological information and the features of each actuator.

15. Cabin according to claim 14, wherein each local power control unit comprises means for transmitting information to the central power control unit in accordance with each maximum nominal power level that can be consumed by an actuator.

16. Cabin according to claim 14, wherein the central power control unit comprises means for transmitting an allocated total available power level to each local power control unit and each local power control unit is capable of controlling each actuator so that the total power consumed is less than the total available power allocated.

17. Cabin according to claim 10, wherein the sensor further measures a torso height of the passenger.

18. Cabin according to claim 9, wherein the sensor measures a torso height of the passenger.

* * * * *